(12) United States Patent
Huang et al.

(10) Patent No.: US 11,393,186 B2
(45) Date of Patent: Jul. 19, 2022

(54) APPARATUS AND METHOD FOR DETECTING OBJECTS USING KEY POINT SETS

(71) Applicant: CANON KABUSHIKI KAISHA, Tokyo (JP)

(72) Inventors: Yaohai Huang, Beijing (CN); Zhiyuan Zhang, Beijing (CN)

(73) Assignee: CANON KABUSHIKI KAISHA, Tokyo (JP)

(*) Notice: Subject to any disclaimer, the term of this patent is extended or adjusted under 35 U.S.C. 154(b) by 47 days.

(21) Appl. No.: 16/798,963

(22) Filed: Feb. 24, 2020

(65) Prior Publication Data

US 2020/0279124 A1 Sep. 3, 2020

(30) Foreign Application Priority Data

Feb. 28, 2019 (CN) .......................... 201910149263.1

(51) Int. Cl.
*G06K 9/46* (2006.01)
*G06V 10/40* (2022.01)
*G06K 9/62* (2022.01)
*G06V 40/10* (2022.01)

(52) U.S. Cl.
CPC ........... *G06V 10/40* (2022.01); *G06K 9/6232* (2013.01); *G06V 40/10* (2022.01); *G06V 2201/08* (2022.01)

(58) Field of Classification Search
CPC .... G06K 9/46; G06K 9/00362; G06K 9/6232; G06K 2209/23
See application file for complete search history.

(56) References Cited

U.S. PATENT DOCUMENTS

| | | | | |
|---|---|---|---|---|
| 9,355,123 | B2* | 5/2016 | Wnuk | G06T 11/60 |
| 10,013,636 | B2* | 7/2018 | Gan | G06K 9/6223 |
| 10,083,524 | B1* | 9/2018 | Malti | G06T 7/75 |
| 10,733,755 | B2* | 8/2020 | Liao | G06T 7/50 |
| 2006/0188160 | A1* | 8/2006 | Matsumoto | G06V 10/752 |
| | | | | 382/190 |

(Continued)

FOREIGN PATENT DOCUMENTS

| | | | | |
|---|---|---|---|---|
| CN | 104537692 A | * | 4/2015 | |
| CN | 108229490 A | * | 6/2018 | ............... G06K 9/44 |
| CN | 108229496 A | * | 6/2018 | ........... G06K 9/4671 |

OTHER PUBLICATIONS

Efficient Online Structured Output Learning for Keypoint-Based Object Tracking, Sam Hare et al., IEEE, 978-1-4673-1228-8, 2012, pp. 1894-1901 (Year: 2012).*

(Continued)

*Primary Examiner* — Jayesh A Patel
(74) *Attorney, Agent, or Firm* — Canon U.S.A., Inc. IP Division (57) ABSTRACT

The present disclosure provides a detection apparatus and method, and image processing apparatus and system. The detection apparatus extracts features from an image, detects objects in the image based on the extracted features; and detects key points of the detected objects based on the extracted features, the detected objects and a pre-obtained key point sets. According to the present disclosure, the whole detection speed can be ensured not to be influenced by the number of objects in the image to be detected while the objects and key points thereof are detected, so as to better meet the requirements of timeliness and practicability of the detection by the actual computer vision task.

7 Claims, 9 Drawing Sheets

(56) References Cited

U.S. PATENT DOCUMENTS

| | | | | |
|---|---|---|---|---|
| 2010/0002909 | A1* | 1/2010 | Lefevre | G06F 3/04815 |
| | | | | 382/103 |
| 2011/0299770 | A1* | 12/2011 | Vaddadi | G06V 10/757 |
| | | | | 382/165 |
| 2013/0322767 | A1* | 12/2013 | Chao | G06V 10/44 |
| | | | | 382/199 |
| 2015/0324998 | A1* | 11/2015 | Song | G06F 16/5838 |
| | | | | 382/171 |
| 2017/0286809 | A1* | 10/2017 | Pankanti | G06N 3/04 |
| 2019/0122380 | A1* | 4/2019 | Cao | G06T 7/75 |
| 2019/0171903 | A1* | 6/2019 | Vajda | G06K 9/6256 |
| 2019/0205668 | A1* | 7/2019 | Noda | G06T 7/44 |
| 2019/0347826 | A1* | 11/2019 | Zhang | G06V 10/82 |
| 2020/0068185 | A1* | 2/2020 | Tzabari | H04N 13/122 |
| 2021/0004619 | A1* | 1/2021 | Qin | G06V 20/597 |

OTHER PUBLICATIONS

Real-time 3D model-based tracking using edge and keypoint features for robotic manipulation, Changhyum Choi et al., IEEE, 978-1-4244-5040-4, 2010, pp. 4048-4055 (Year: 2010).*

Using Mutual Information for Multi-Anchor Tracking of Human Beings, Silvio Barra et al., Springer, 10.1007/978-3-319-13386-7_3, 2014, pp. 28-39 (Year: 2014).*

Learning Actions to Improve the Perceptual Anchoring of Objects, Andreas Persson et al., Frontiers in Robotics and AI, Jan. 2017, pp. 1-17 (Year: 2017).*

He, K., et al., "Mask R-CNN", Facebook AI Research (FAIR), Jan. 24, 2018, pp. 1-12.

* cited by examiner

FIG.18

APPARATUS AND METHOD FOR DETECTING OBJECTS USING KEY POINT SETS

BACKGROUND

Field

The present disclosure relates to an image processing, in particular to a detection of objects and key points thereof in an image, for example.

Description of the Related Art

Key point detection of objects (for example human, non-human objects or the like) is a basis of many computer vision tasks, such as motion detection and classification, abnormal/dangerous behavior detection, and automatic driving. Therefore, the key point detection of objects is very important. At present, the conventional method is to simplify a complicated key point detection problem for a plurality of objects into a key point detection problem for a single object. The detailed operations include detecting, from an image, a plurality of objects (for example, boundary boxes of the objects), and then, for each detected object, corresponding key points are detected from the boundary boxes thereof.

For example, the non-patent document "Mask R-CNN" (Kaiming He, Georgia Gkioxari, Piotr Doll'ar, Ross Girshick; Facebook AI Research; ICCV 2017) discloses an exemplary technique for detecting key points of objects by using a neural network. The neural network used in the exemplary technique includes for example a network branch for detecting objects and a network branch for detecting key points of objects. The exemplary technique detecting objects in an image by using the network branch for detecting objects and obtaining the categories of the objects. Then, for each detected object, the key points of the object are detected by using the network branch for detecting key points of objects.

As described above, it can be known that in the course of detecting the key points of the objects, the above methods need to realize the corresponding detections by two independent stages. The operation of one stage is to detect objects (for example including boundary boxes of the objects and the categories of the objects) in the image. The operation of the other stage is to detect, for each detected object, the corresponding key points thereof. That is, the key point detecting operation is required to be performed on each detected object one by one during this stage. Accordingly, in a case where the number of objects in an image to be detected is large, the time spent in the key point detecting operation will increase, so as to influence the whole detection speed (for example, the detection speed becomes slow). In other words, the time spent in the key point detecting operation is directly related to the number of objects in the image to be detected. Therefore, the larger the number of objects in the image to be detected is, the more the time spent in the key point detecting operation will be, and the greater the whole detection speed will be influenced, thus the timeliness and practicability of the actual computer vision task will be influenced.

SUMMARY OF THE INVENTION

The present disclosure is directed to address at least one of the above problems.

According to one aspect of the present disclosure, a detection apparatus is provided and includes a feature extraction unit which extracts features from an image; an object detection unit which detects objects in the image based on the extracted features; and a key point detection unit which detects key points of the detected objects based on the extracted features, the detected objects and pre-obtained key point sets.

According to another aspect of the present disclosure, a detection method is provided and includes a feature extraction step of extracting features from an image; an object detection step of detecting objects in the image based on the extracted features; and a key point detection step of detecting key points of the detected objects based on the extracted features, the detected objects and pre-obtained key point sets.

In the present disclosure, the objects in the image include, for example, humans in the image and non-human objects in the image. The detected object has at least region information of the object and category confidence information of the object. In the present disclosure, one key point set in the pre-obtained key point sets may describe for example a shape of one object and/or a posture of one object.

According to a further aspect of the present disclosure, an image processing apparatus is provided and includes an acquisition device for acquiring an image or a video; a storage device in which instructions are stored; and a processor which executes the instructions based on the acquired image or video, such that the processor implements at least the detection method as described above.

According to a further aspect of the present disclosure, an image processing system is provided and includes an acquisition apparatus for acquiring an image or a video; the detection apparatus as described above, for detecting objects and key points thereof from the acquired image or video; and a processing apparatus for executing subsequent image processing operations based on the detected objects and key points thereof; wherein, the acquisition apparatus, the detection apparatus and the processing apparatus are connected with each other via a network.

The present disclosure describes how the object detection and the key point detection in the image is to be achieved in one stage manner by simultaneously extracting features which can be used in the object detecting operation and the key point detecting operation and by using the pre-obtained key point sets. That is, the key point detecting operation may be integrated into the process of the object detecting operation so as to be implemented together. Therefore, according to the present disclosure, the time spent in the key point detecting operation (that is, the speed of key point detection) is independent of the number of objects in the image to be detected. Thus, according to the present disclosure, the whole detection speed can be ensured not to be influenced by the number of objects in the image to be detected while the objects and key points thereof are detected, so as to better meet the requirements of timeliness and practicability of the detection by the actual computer vision task.

Further features and advantageous of the present disclosure will become apparent from the following description of typical embodiments with reference to the accompanying drawings.

BRIEF DESCRIPTION OF THE DRAWINGS

The accompanying drawings, which are incorporated in and constitute a part of the specification, illustrate embodiments of the present disclosure, and together with the description of the embodiments, serve to explain the principles of the present disclosure.

DESCRIPTION OF THE EMBODIMENTS

Exemplary embodiments of the present disclosure will be described in detail below with reference to the accompanying drawings. It shall be noted that the following description is merely illustrative and exemplary in nature, and is in no way intended to limit the present disclosure and its applications or uses. The relative arrangement of components and steps, numerical expressions and numerical values set forth in the embodiments do not limit the scope of the present disclosure unless it is otherwise specifically stated. In addition, techniques, methods and devices known by persons skilled in the art may not be discussed in detail, but should be a part of the specification where appropriate.

Please note that similar reference numerals and letters refer to similar items in the drawings, and thus once an item is defined in one drawing, it is not necessary to discuss it in the following drawings.

On the one hand, it can be seen as described above, in the above conventional methods, it is necessary to extract features for detecting objects and features for detecting key points separately, since the object detecting operation and the key point detecting operation are performed independently. In addition, the key point detecting operation needs to be performed on each detected object one by one, such that it is necessary to extract corresponding features used for key point detection for each detected object. Thus it can be seen that in the above conventional methods, especially in a case where the number of objects in the image to be detected is large, the time spent in feature extracting operation will also influence the time spent in the whole detection processing. Since the features extracted from the image and related to the whole image usually contain features that can be used for various operations, for example, the features related to objects therein may be used for object detection, and features related to key points of objects therein may be used for key point detection, etc. Therefore, the features related to the whole image may be simultaneously extracted from the image, such that the subsequent object detecting operation and key point detecting operation both can use the features, and the influence on time spent in the feature extracting operation on the time spent in the whole detection processing can also be reduced as much as possible. Hereinafter, the above extracted features may, for example, be regarded as "Shared features", wherein, in the present disclosure, the Shared features contain at least the features related to objects and the features related to key points of objects. However, it is obviously not limited to this.

Figure 1A:
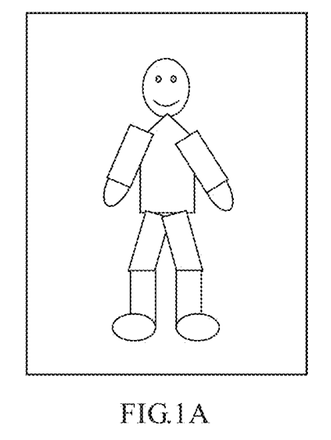
FIGS. 1A-1B schematically show an example in which a human is described by a certain number of key points which are located at specific positions according to the present disclosure.
Figure 1B:
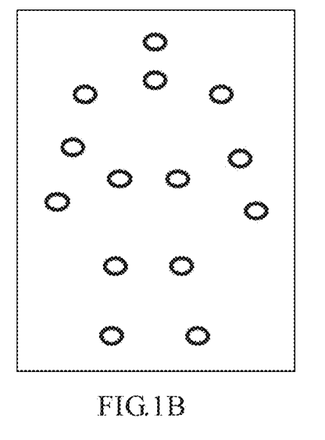
Figure 2A:
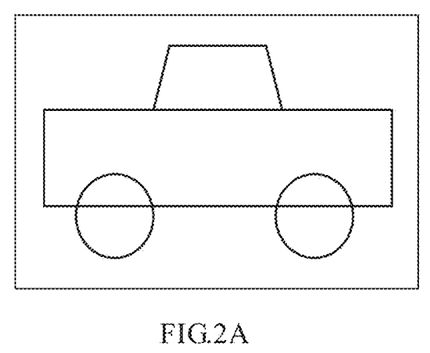
FIGS. 2A-2B schematically show an example in which a car is described by a certain number of key points which are located at specific positions according to the present disclosure.
Figure 2B:
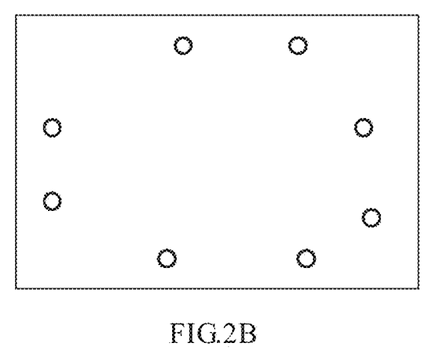
Figure 3A:
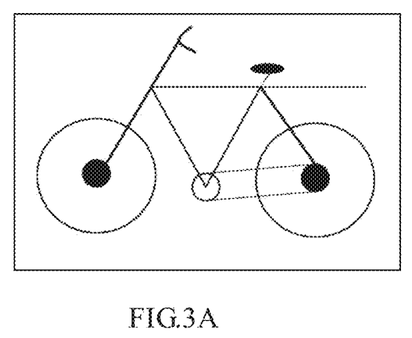
FIGS. 3A-3B schematically show an example in which a bicycle is described by a certain number of key points which are located at specific positions according to the present disclosure.
Figure 3B:
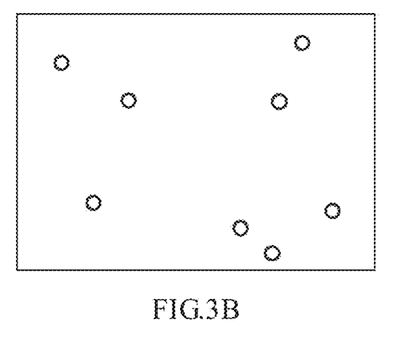

On the other hand, as mentioned above, in the above conventional methods, the object detecting operation and the key point detecting operation are performed independently, so the time spent in the key point detecting operation is directly related to the number of objects in the image to be detected. As for a certain category of objects, they can be usually described by a certain number of key points located at specific positions. For example, in a case where the object is a person (for example as shown in FIG. 1A), it can usually be described by these key points shown in FIG. 1B, wherein the dots shown in FIG. 1B represent, for example, the key points of the person. As another example, in a case where the object is a car (for example, as shown in FIG. 2A), it can usually be described by these key points shown in FIG. 2B, wherein the dots shown in FIG. 2B represent, for example the key points of the car. As a further example, in a case where the object is a bicycle (for example, as shown in FIG. 3A), it can usually be described by these key points shown in FIG. 3B, wherein the dots shown in FIG. 3B represent, for example, the key points of the bicycle. Therefore, each category of objects can be described by at least one set of key points composed of a certain number of key points located at specific positions. Hereinafter, the key points, for example, can be regarded as "anchors", and the set of key points, for example, can be regarded as "anchor set". Thus, at least one anchor set can be pre-built for each category of objects, and the detection of key points of each category of objects can be constrained based on the pre-built anchor set to integrate the key point detecting operation into the process of the object detecting operation so as to be implemented together, without performing an independent key point detection for each detected object one by one (for example, extracting features for key point detection separately, and performing corresponding detection operations separately). Therefore, according to the present disclosure, the time spent in the key point detecting operation (that is, the speed of key point detection) is independent of the number of objects in the image to be detected. Thus, according to the present disclosure, the whole detection speed is not influenced by the number of objects in the image to be detected while the objects and its key points are detected, so as to better meet the requirements of timeliness and practicability of the detection by the actual computer vision task.

(Hardware Configuration)

Firstly, the hardware configuration which can realize the techniques described below will be described with reference to FIG. 4.

Hardware configuration 400 includes, for example, a central processing unit (CPU) 410, a random access memory (RAM) 420, a read-only memory (ROM) 430, a hard disk 440, an input device 450, an output device 460, a network interface 470, and a system bus 480. In addition, in one implementation, the hardware configuration 400 may be implemented by a computer, such as a tablet, a laptop, a desktop, or other suitable electronic devices. In another implementation, the hardware configuration 400 may be implemented by a monitoring device, such as a digital camera, a video camera, a network camera, or other suitable electronic devices. In a case where the hardware configuration 400 is implemented by the monitoring device, the hardware configuration 400 also includes, for example, an optical system 490.

In one implementation, the detection apparatus according to the present disclosure is configured by hardware or firmware and is used as a module or component of the hardware configuration 400. For example, a detection apparatus 500 to be described in detail below with reference to FIG. 5 or a detection apparatus 1300 to be described in detail below with reference to FIG. 13 may be used as the module or component of the hardware configuration 400. In another implementation, the detection apparatus according to the present disclosure is configured by software stored in the ROM 430 or the hard disk 440 and executed by the CPU 410. For example, a process 700 to be described in detail below with reference to FIG. 7 and a process 1500 to be described in detail below with reference to FIG. 15 may be used as a program stored in the ROM 430 or the hard disk 440.

CPU 410 is any suitable and programmable control device (such as a processor) and can execute various functions to be described below by executing various applications stored in the ROM 430 or the hard disk 440 (such as memory). RAM 420 is used to temporarily store programs or data loaded from the ROM 430 or the hard disk 440, and is also used as a space in which the CPU 410 executes various procedures (such as implementing the techniques to be described in detail below with reference to FIGS. 7 to 12B and FIGS. 15 to 16) and other available functions. The hard disk 440 stores various types of information such as operating system (OS), various applications, control programs, videos, images, pre-generated networks (e.g., neural networks) and pre-built/obtained anchor set.

In one implementation, the input device 450 is used to allow a user to interact with the hardware configuration 400. In one example, the user may input a video/an image via the input device 450. In another example, the user may trigger the corresponding processing of the present disclosure by the input device 450. In addition, the input device 450 may be in a variety of forms, such as buttons, keyboards or touch screens. In another implementation, the input device 450 is used to receive a video/an image output from dedicated electronic devices such as a digital camera, a video camera and/or a network camera. In addition, in a case where the hardware configuration 400 is implemented by the monitoring device, the optical system 490 in the hardware configuration 400 will directly capture the video/image of the monitoring site.

In one implementation, the output device 460 is used to display the detection results (such as the detected objects and the key points thereof), to the user. Furthermore, the output device 460 may be in a variety of forms such as a cathode ray tube (CRT) or an LCD display. In another implementation, the output device 460 is used to output the detection results to the subsequent image processing, such as motion detection and classification, abnormal/dangerous behavior detection, and so on.

The network interface 470 provides an interface for connecting the hardware configuration 400 to the network. For example, the hardware configuration 400 may perform data communication with other electronic devices connected by means of the network via the network interface 470. Alternatively, the hardware configuration 400 may be provided with a wireless interface for wireless data communication. The system bus 480 may provide data transmission paths for transmitting data with each other among the CPU 410, the RAM 420, the ROM 430, the hard disk 440, the input device 450, the output device 460, the network interface 470, the optical system 490 and so on. Although called a bus, the system bus 480 is not limited to any particular data transmission techniques.

The above hardware configuration 400 is merely illustrative and is in no way intended to limit the present disclosure, its applications or uses. Moreover, for the sake of simplicity, only one hardware configuration is shown in FIG. 4. However, a plurality of hardware configurations may be used as required.

(Detection Apparatus and Method)

Next, the detection processing according to the present disclosure will be described with reference to FIG. 5 to FIG. 16.

Figure 5:
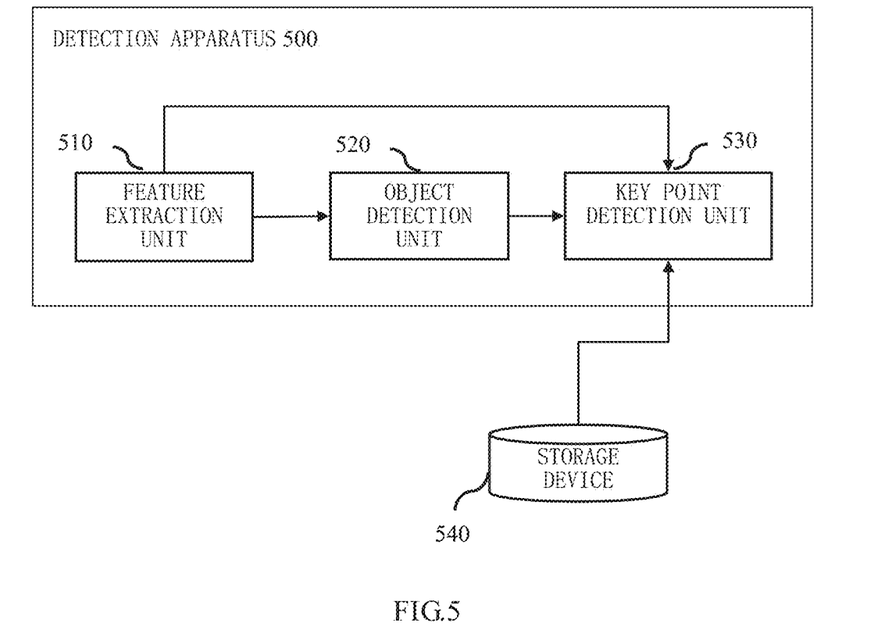
FIG. 5 is a block diagram illustrating a configuration of a detection apparatus according to a first embodiment of the present disclosure.

FIG. 5 is a block diagram illustrating the configuration of the detection apparatus 500 according to the first embodiment of the present disclosure. Some or all of the modules shown in FIG. 5 may be realized by the dedicated hardware. As shown in FIG. 5, the detection apparatus 500 includes a feature extraction unit 510, an object detection unit 520 and a key point detection unit 530.

In addition, a storage device 540 shown in FIG. 5 stores, for example, at least the pre-built/obtained key point sets (i.e., anchor sets). In one implementation, the storage device 540 is the ROM 430 or the hard disk 440 shown in FIG. 4. In another implementation, the storage device 540 is a server or an external storage device connected to the detection apparatus 500 via a network (not shown).

Figure 4:
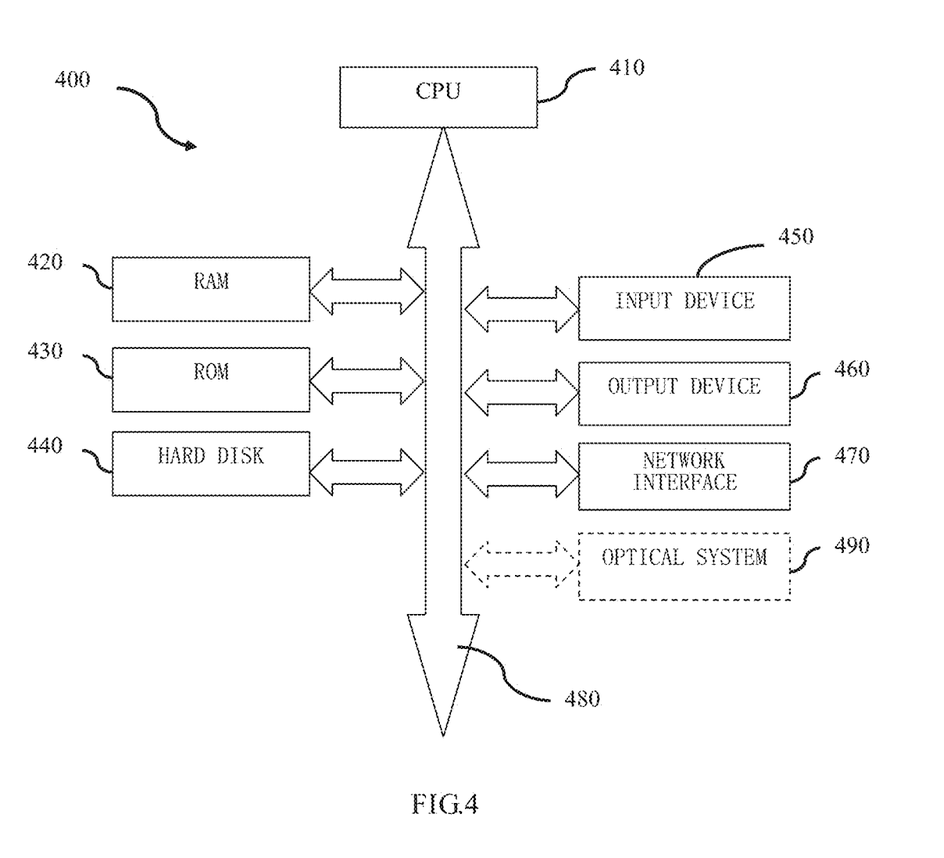
FIG. 4 is a block diagram schematically showing a hardware configuration capable of implementing a technique according to an embodiment of the present disclosure.

At first, in one implementation, for example, in a case where the hardware configuration 400 shown in FIG. 4 is implemented by a computer, the input device 450 receives an image output from a dedicated electronic device (for example, a video camera, etc.) or input by the user. The input device 450 then transmits the received image to the detection apparatus 500 via the system bus 480. In another implementation, for example, in a case where the hardware configuration 400 is implemented by a monitoring device, the detection apparatus 500 directly uses the image captured by the optical system 490.

Then, as shown in FIG. 5, the feature extraction unit 510 extracts features from the received image (i.e., the whole image). As described above, the extracted features may be regarded as shared features, and the extracted features contain, for example, at least features related to objects and features related to key points of the objects. As described above, the objects in the image include for example the human in the image and non-human objects in the image. In one implementation, the feature extraction unit 510 extracts the shared features from the received image by using various feature extraction operators, such as a convolution neural network with a structure of VGC16, ResNet, SENe, Darknet and so on.

The object detection unit 520 detects objects in the received image based on the shared features extracted by the feature extraction unit 510. In one implementation, the object detection unit 520 detects the human and/or objects of interest in the received image based on the features related to objects in the extracted shared features by using a conventional regression algorithm. As described above, in the present disclosure, the detected objects have, for example, at least region information of the objects and the category confidence information of the objects.

The key point detection unit 530 detects key points of the detected objects based on the shared features extracted by the feature extraction unit 510, the objects detected by the object detection unit 520 and the pre-built/obtained key point sets (i.e., anchor sets) stored in the storage device 540. As described above, each of the pre-obtained anchor sets is composed of a certain number of key points at specific positions and can be used to describe one object. In one implementation, the key point detection unit 530 detects key points of the detected objects based on the detected objects, the features related to key points of the objects among the extracted shared features and the pre-obtained anchor sets by using a conventional regression algorithm. In the present disclosure, each of the detected key points has, for example, the corresponding confidence information, so that it can be judged whether the key point is a real key point or judged whether the key point is an occluded key point according to the confidence information of each key point.

Finally, the object detection unit 520 and the key point detection unit 530, via the system bus 480 shown in FIG. 4, transmit the detection results (for example, the detected objects and the key points thereof) to the output device 460, to display the detection results to the user, or to output the detection results to the subsequent image processing such as motion detection and classification, abnormal/dangerous behavior detection, and so on.

Figure 6:
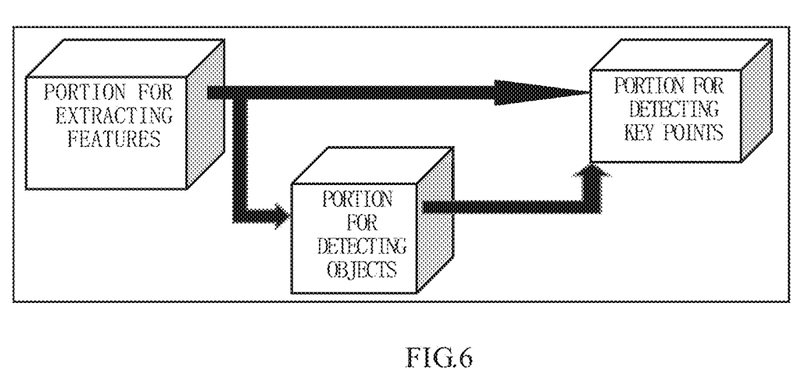
FIG. 6 schematically shows a schematic structure of a pre-generated neural network applicable to the first embodiment of the present disclosure.

In addition, preferably, in one implementation, each unit in the detection apparatus 500 shown in FIG. 5 (i.e., the feature extraction unit 510, the object detection unit 520 and the key point detection unit 530) may execute the corresponding operations by using the pre-generated neural network. In the present disclosure, the pre-generated neural network may be called as, for example, the pre-generated first neural network. On the one hand, for example, as shown in FIG. 6, the pre-generated first neural network applicable to the first embodiment of the present disclosure includes, for example, a portion for extracting features (i.e., sub-network), a portion for detecting objects, and a portion for detecting key points. In the present disclosure, each portion of the first neural network can be pre-generated by an end-to-end training manner and an updating manner of a backward propagation based on for example sample images in which a region, a category and key points of an object are labeled. On the other hand, the pre-generated first neural network for example may be stored in a storage device 540.

Specifically, the detection apparatus 500 acquires the pre-generated first neural network from the storage device 540. The feature extraction unit 510 extracts the shared features from the received image, by using the portion for extracting features of the neural network. The object detection unit 520 detects the objects in the received image, by using the portion for detecting objects in the neural network, based on the shared features extracted by the feature extraction unit 510. The key point detection unit 530 detects the key points of the detected objects, by using the portion for detecting key points in the neural network, based on the shared features extracted by the feature extraction unit 510, the objects detected by the object detection unit 520 and the pre-obtained anchor sets stored in the storage device 540.

Figure 7:
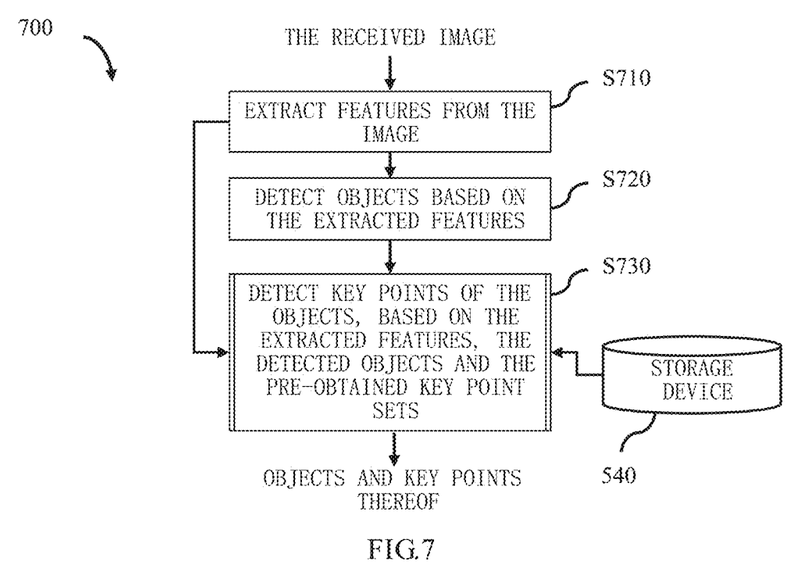
FIG. 7 schematically shows a flowchart of a detection method according to the first embodiment of the present disclosure.

The flowchart 700 shown in FIG. 7 is a corresponding procedure of the detection apparatus 500 shown in FIG. 5.

As shown in FIG. 7, in the feature extracting step S710, the feature extraction unit 510 extracts the features (i.e., shared features) from the received image.

After obtaining the shared features, in the object detecting step S720, the object detection unit 520 detects the objects in the received image based on the extracted shared features. For example, the object detection unit 520 detects the objects in the received image based on the features related to the objects among the extracted shared features by using the conventional regression algorithm. As described above, the detected objects have, for example, at least region information of the objects and the category confidence information of the objects.

After detecting the objects in the image, in the key point detecting step S730, the key point detection unit 530 detects the key points of the detected objects, based on the extracted shared features, the detected objects and the pre-built/obtained key point sets (i.e., anchor sets) stored in the storage device 540. For example, the key point detection unit 530 detects the key points of the detected objects, based on the detected objects, the features related to key points of the objects among the extracted shared features, and the pre-obtained anchor sets by using the conventional regression algorithm. In one implementation, for any one of the detected objects, the key point detection unit 530 executes the corresponding key point detecting operation with reference to FIG. 8.

Figure 8:
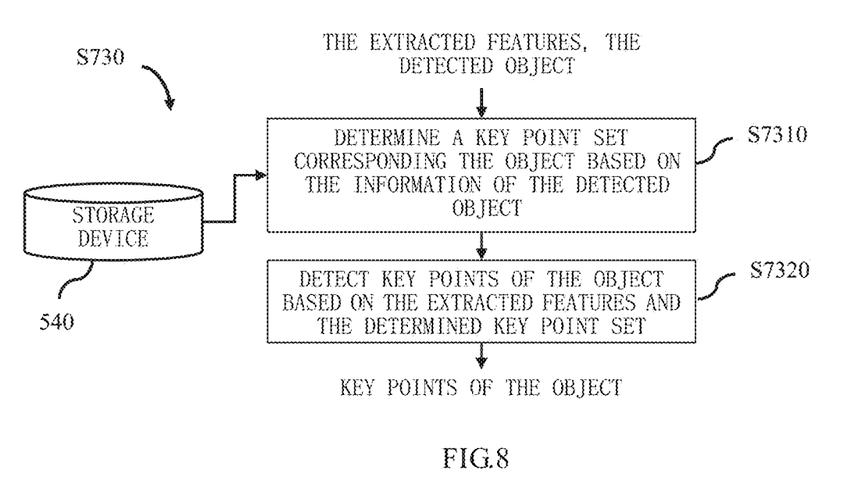
FIG. 8 schematically shows a flowchart of a key point detection step S730 as shown in FIG. 7 according to the first embodiment of the present disclosure.

As shown in FIG. 8, in step S7310, the key point detection unit 530 determines an anchor set corresponding to the object from the pre-obtained anchor sets stored in the storage device 540 based on the information of the object. As described above, each category of objects can be described by at least one anchor set composed of a certain number of anchors at specific positions.

Figure 9:
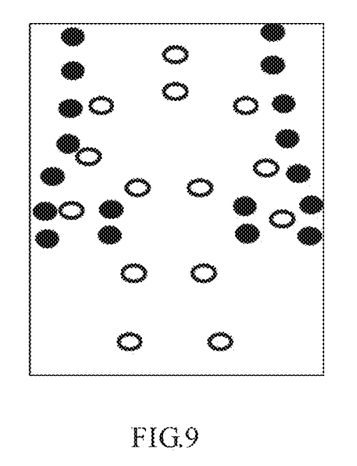
FIG. 9 schematically shows an example of an anchor set corresponding to the human updated according to the present disclosure.

Thus, in one implementation, each of pre-obtained anchor sets can be used to describe one category of objects. In other words, each category of objects corresponds to one anchor set of pre-obtained anchor sets, respectively. Thus, in this case, the key point detection unit 530 determines an anchor set corresponding to the detected object by for example the following manner. Firstly, an anchor set corresponding to the category of the object from the pre-obtained anchor sets is selected based on the category confidence information of the object. For example, in a case where the detected object is a human, the selected anchor set is, for example, as shown in FIG. 1B, wherein the rectangular frame shown in FIG. 1B indicates the size of the region of the anchor set. Then, alternatively, adjusting the region size of the selected anchor set based on the region information of the object, such that the region size of the anchor set, for example, is the same as the region size of the object, and thus the selected anchor set may be used for the subsequent key point detection. In addition, for other objects in the image, such as non-human objects (for example, cars, bicycles, etc.), the corresponding anchor set may be determined in a similar manner as the above. Further, in this case, when the detected object is a human, because some parts of the human (in particular, the arm of the human) usually has a larger movement change, for example the human's arm will usually be lifted up, waved, bent, etc., the part with larger movement change of the human can't be described well in a case where the human is described by using only one fixed anchor set. In order to improve the detection precision of the key points of the human, especially the detection precision of the key points of the part of the human that has larger movement changes, after the key point detection unit 530 determines the anchor set corresponding to the human from the pre-obtained anchor sets in the manner as described above, the key point detection unit 530 may further update the determined anchor set corresponding to the human based on the part information of the human. For example, for the anchors for describing the human's arm in the determined anchor set corresponding to the human, the key point detection unit 530 will add corresponding anchors around these anchors based on the possible movement changes of the arm (for example, lifting, waving, bending, etc.). As described above, the determined anchor set corresponding to the human is as shown in FIG. 1B, for example, and the updated anchor set is as shown in FIG. 9, for example, wherein the small black dots shown in FIG. 9 indicate the newly added anchors. In addition, a similar updating operation may be performed for anchors for describing human's legs in the anchor set.

Figure 10A:
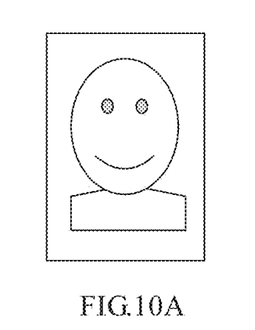
FIGS. 10A-10B schematically show an example of a human with one type of shape and an anchor set which can be used to describe the human according to the present disclosure.
Figure 10B:
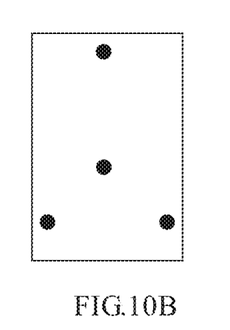
Figure 11A:
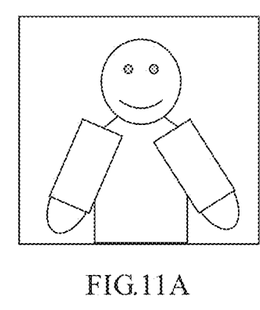
FIGS. 11A-11B schematically show an example of a human with another type of shape and an anchor set which can be used to describe the human according to the present disclosure.
Figure 11B:
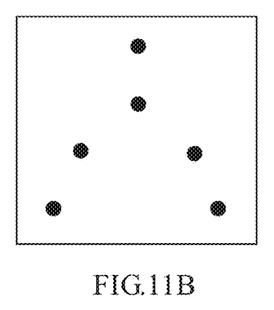
Figure 12A:
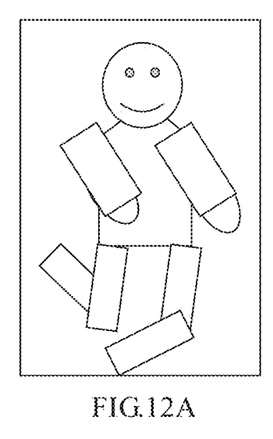
FIGS. 12A-12B schematically show an example of a human with a certain posture and a certain shape and an anchor set which can be used to describe the human according to the present disclosure.
Figure 12B:
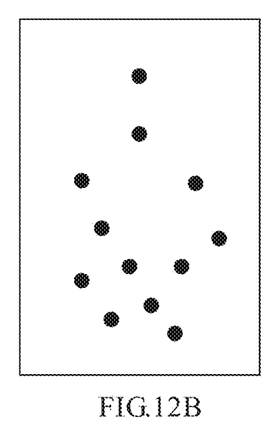

Because objects often have different shapes and/or postures in the image, one category of objects can also be described by more than one anchor sets, wherein each anchor set can be composed of a certain number of anchors at specific positions. Taking the human as an example, on the one hand, the human usually has the following shapes, for example head shape, upper body shape, whole body shape, side body shape and so on. On the other hand, the human usually has the following postures (especially, movement postures), for example, walking upright, running, pushing, etc. However, the shapes/postures are obviously not limited to these. For example, in case where the shape of the human is as shown in FIG. 10A, the anchor set that can describe it is as shown in FIG. 10B, wherein the small black dots shown in FIG. 10B, for example, indicate the key points of the human (i.e., the anchors). In a case where the shape of the human is as shown in FIG. 11A, the anchor set that can describe it is as shown in FIG. 11B, wherein the small black dots shown in FIG. 11B, for example, indicate the anchors of the human. In a case where the shape and posture of the human are as shown in FIG. 12A, the anchor set that can describe it is as shown in FIG. 12B, wherein the small black dots shown in FIG. 12B, for example, indicate the anchors of the human. Wherein, the anchor sets shown in the above figures are only illustrative, as long as an anchor set can describe the shape and/or posture of the corresponding human, it can be used as the anchor described in the present disclosure. In addition, other objects with different shapes and/or postures, for example non-human objects (e.g., cars, bicycles, etc.), can be similarly described by different anchor sets. Therefore, in order to improve the detection precision of key points, in another implementation, a plurality of anchor sets among the pre-obtained anchor sets can be used to describe one category of objects. That is, each category of objects can correspond to a plurality of anchor sets among the pre-obtained anchor sets. Therefore, in this case, the object detection unit 520 shown in FIG. 5 can detect the object's shape information in addition to the region information and category confidence information of the object. For example, the object detection unit 520 can detect the shape information of the objects in the received image based on the features related to objects in the extracted shared features by using the conventional regression algorithm. In other words, an object detected by the object detection unit 520 also has the shape information of the object. On the other hand, the key point detection unit 530, determines the anchor set corresponding to the detected object by the following manner. Firstly, the anchor set corresponding to both of the category and the shape of the object from the pre-obtained anchor sets is selected based on the category confidence information and the shape information of the object. For example, in a case where the detected object is the human and its shape and posture for example is as shown in FIG. 12A, the selected anchor set for example is as shown in FIG. 12B, wherein the rectangular frame shown in FIG. 12B indicates the region size of the anchor set. Then adjusting the region size of the selected anchor set based on the region information of the object. In addition, for other objects in the image, the corresponding anchor set may be determined in a similar manner as above. In addition, in this case, the above pre-obtained anchor set (i.e., the key point set) may be obtained based on sample images in which sample key points corresponding to the shape of the object are labeled and/or sample key points corresponding to the posture of the object are labeled.

Return to FIG. 8, after determining the anchor set corresponding to the object (including the updated anchor set), the key point detection unit 530 detects the key points of the object based on the extracted features (i.e., shared features) and the determined key point set (i.e., anchor set) in step S7320. For example, the key point detection unit 530 may take the anchors in the determined anchor set as the initial points of the key point detection, and perform a corresponding regression operation on these initial points by using conventional regression algorithm based on features related to key points of the object among the extracted shared features, so as to obtain the final key points of the object. In addition, as described above, each of the detected key points has confidence information corresponding to thereof. Therefore, in a case where there are a plurality of key points at a certain one portion/part of the object (for example, human's arm), for example, the key points with the maximum confidence information at this portion/part may be output as the final key points of this portion/part. However, the present disclosure is not limited to this, and the final key points may be determined by other manners.

Finally, returning to FIG. 7, the object detection unit 520 and the key point detection unit 530, via the system bus 480 shown in FIG. 4, transmit the detection results (for example, the detected objects and the key points thereof) to the output device 460, to display the detection results to the user, or to output the detection results to the subsequent image processing such as motion detection and classification, abnormal/dangerous behavior detection, and so on.

In addition, as described in FIG. 5, each unit in the detection apparatus 500 (i.e., the feature extraction unit 510, the object detection unit 520 and the key point detection unit 530) may execute the corresponding operations by using the pre-generated neural network (for example the first neural network). Therefore, each step shown in FIG. 7 (i.e., the feature extracting step S710, the object detecting step S720 and the key point detecting step S730) may also execute the corresponding operations by using the pre-generated neural network.

Figure 13:
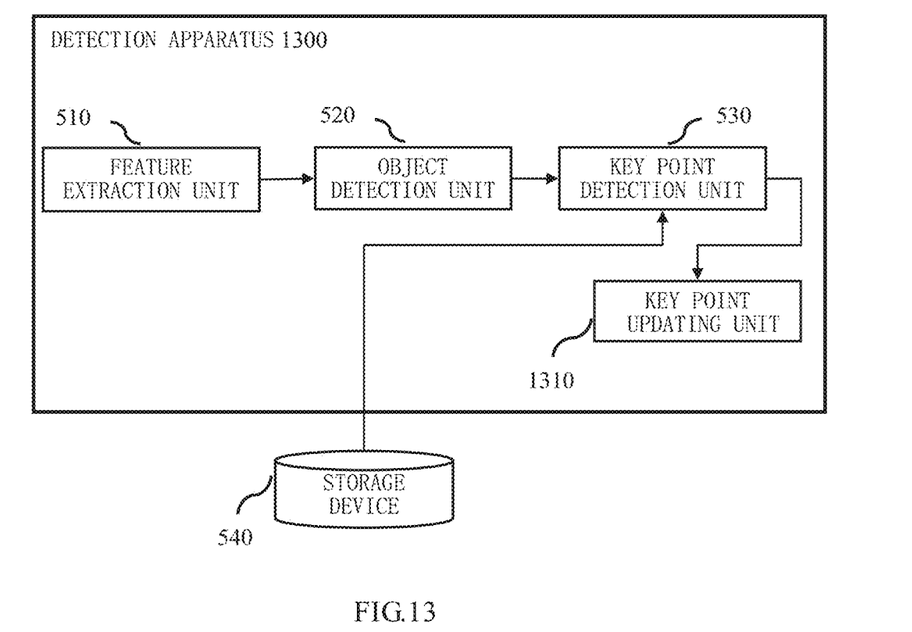
FIG. 13 is a block diagram illustrating a configuration of a detection apparatus according to a second embodiment of the present disclosure.

In addition, in the operation of key point detection, there are sometimes some key points that are difficult to be detected, such as the occluded key points, the key points with larger movement change, and the key points that have no obvious features. For these key points, in order to get more accurate detection results, FIG. 13 is a block diagram illustrating a configuration of a detection apparatus 1300 according to a second embodiment of the present disclosure. Some or all of the modules shown in FIG. 13 may be realized by the dedicated hardware. As shown in FIG. 13, the detection apparatus 1300 includes a feature extraction unit 510, an object detection unit 520, a key point detection unit 530 and a key point updating unit 1310.

The feature extraction unit 510, the object detection unit 520, the key point detection unit 530 and the storage device 540 shown in FIG. 13 are the same to each unit shown in FIG. 5, so they are not repeatedly described here again.

Figure 14:
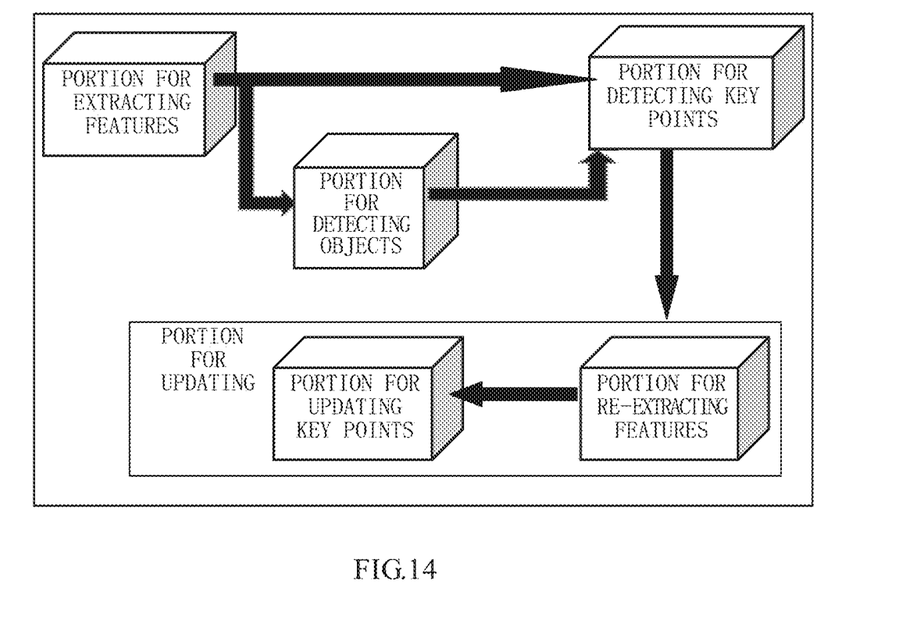
FIG. 14 schematically shows a schematic structure of a pre-generated neural network applicable to the second embodiment of the present disclosure.

As shown in FIG. 13, after the feature extraction unit 510, the object detection unit 520 and the key point detection unit 530 therein detect the key points of the object in the received image with reference to the corresponding description of the FIGS. 5 to 12B, the key point updating unit 1310 executes updating operation at least once on a part of key points among the detected key points of the object, to update the detected key points of the object. As illustrated in FIGS. 5 to 12B, each key point detected by the key point detection unit 530 has the confidence information corresponding to thereof, so in one implementation, the key point updating unit 1310, for example, based on the predefined threshold and the confidence information of the detected key points of the object, determines the key points to which the updating operation is required to be performed and determines the number of times of performing the updating operation, wherein the performed updating operation for example is realized by using the conventional regression algorithm. In addition, as described in FIG. 5, each unit in the detection apparatus 500 may execute the corresponding operations by using the pre-generated neural network. Similarly, each unit (i.e., the feature extraction unit 510, the object detection unit 520, the key point detection unit 530 and the key point updating unit 1310) in the detection apparatus 1300 shown in FIG. 13 may also execute the corresponding operations by using the pre-generated neural network, wherein the pre-generated neural network may be called as for example the pre-generated second neural network in the present disclosure. On the one hand, as shown in FIG. 14, the pre-generated second neural network applicable to the second embodiment of the present disclosure includes, for example, a portion for extracting features (i.e., sub-network), a portion for detecting objects, a portion for detecting key points and a portion The portion for updating includes, for example, at least one layer of network, and each layer of network includes, for example, a portion for re-extracting features and a portion for updating key points. In the present disclosure, each portion of the second neural network can be pre-generated by an end-to-end training manner and an updating manner of a backward propagation based on for example sample images in which a region, a category and key points of an object are labeled. The structure of the neural network for the portion for extracting features and the structure of the neural network for the portion for re-extracting features may be, for example, VGC16, ResNet, SENe, Darknet and so on. During the generation of the second neural network, for each layer of network in the portion for updating, it may be regarded as one "end" to be processed. On the other hand, the pre-generated second neural network for example may be stored in the storage device 540.

Specifically, the detection apparatus 1300 acquires the pre-generated second neural network from the storage device 540. As illustrated in FIG. 5, the feature extraction unit 510, the object detection unit 520 and the key point detection unit 530 execute the corresponding operation by using the related portion of the neural network, and the key point updating unit 1310 executes the corresponding updating operation on the key points of the object detected by the key point detection unit 530 by using the portion for updating in the neural network.

Figure 15:
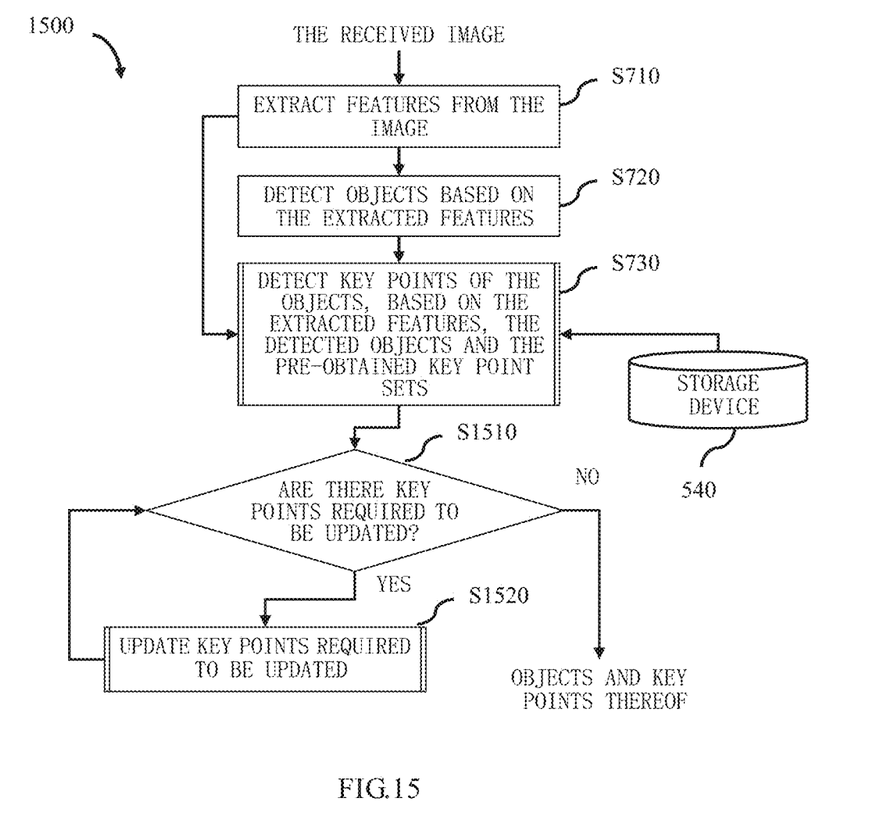
FIG. 15 schematically shows a flowchart of a detection method according to the second embodiment of the present disclosure.

The flowchart 1500 shown in FIG. 15 is a corresponding procedure of the detection apparatus 1300 shown in FIG. 13.

As shown in FIG. 15, since the feature extracting step S710, the object detecting step S720 and the key point detecting step S730 are the same to the operation executed in each step shown in FIG. 7, so they are not repeatedly described here again.

After the key point detection unit 530 detects the key points of the object from the received image via the key point detecting step S730, the key point updating unit 1310 executes updating operation at least once on a part of key points among the detected key points of the object, to update the detected key points of the object.

Specifically, in step S1510, the key point updating unit 1310 judges whether there are key points required to be updated in the detected key points of the object. In the present disclosure, the key points required to be updated are, for example, the above key points that are difficult to be detected (for example, the occluded key points, the key points with larger movement change, and the key points that have no obvious features, etc.). In one implementation, for each of the key points detected by key point detection unit 530, the key point updating unit 1310 compares the confidence information of the key point with a predefined threshold (for example, $TH_n$) to determine whether it belongs to key points required to be updated. For example, if the confidence information of the key point is greater than or equal to the predefined threshold, the key point is considered to be relatively easy to detect and does not need to be updated. If the confidence information of the key point is less than the predefined threshold, the key point is considered to be difficult to detect and needs to be updated. The above n indicates the number of times of the updating operation required to be performed. That is, the thresholds used to determine whether there are key points required to be updated may be different each time. However, it is not limited to this.

In the step S1520, the key point updating unit 1310 executes the corresponding updating operation on the key points which are judged to be updated. In one implementation, the key point updating unit 1310 executes the corresponding updating operation with reference to FIG. 16.

Figure 16:
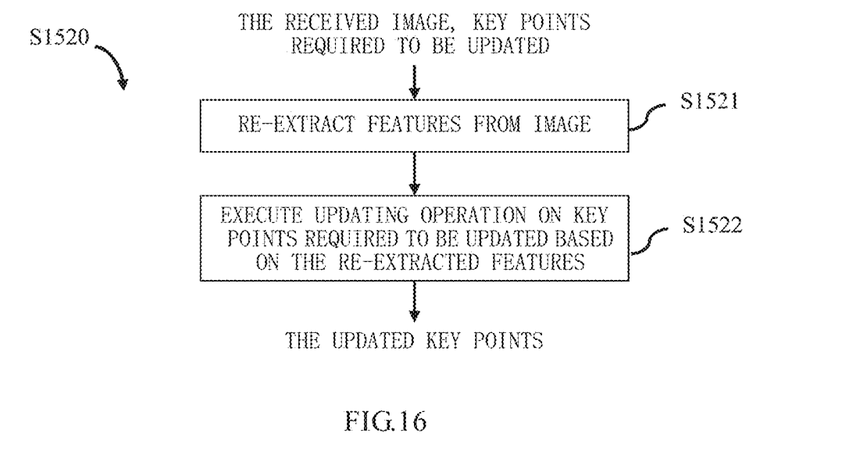
FIG. 16 schematically shows a flowchart of step S1520 as shown in FIG. 15 according to the second embodiment of the present disclosure.

As shown in FIG. 16, in the step S1521, the key point updating unit 1310 extracts the features related to the key points required to be updated from the received image, wherein the re-extracted features are for example heat maps.

In the step S1522, the key point updating unit 1310 executes the updating operation on the key points required to be updated based on the re-extracted features. In one implementation, the key point updating unit 1310 takes the key points required to be updated as the initial points of the key point updating, and perform a corresponding regression operation on the initial points by using conventional regression algorithm based on the extracted feature map, to update the key points required to be updated. In another implementation, the key point updating unit 1310 updates, based on the extracted heat map, the key points required to be updated by using an algorithm based on the heat map.

Return to FIG. 15, for key points updated by the step S1520, flow 1500 will return to step S1510, and the key point updating unit 1310 will judge whether there are still key points required to be updated in the updated key points. In a case where there are still key points required to be updated, the key point updating unit 1310 will execute a further updating operation on these key points required to be updated again in step S1520 until there are no key points required to be updated.

In a case where there is no key points required to be updated, the object detection unit 520 and the key point detection unit 530/the key point updating unit 1310 transmit, via the system bus 480 shown in FIG. 4, the detection results (for example, the detected objects and the key points thereof) to the output device 460, to display the detection results to the user, or to output the detection results to the subsequent image processing such as motion detection and classification, abnormal/dangerous behavior detection, and so on.

In addition, as described in FIG. 13, each unit in the detection apparatus 1300 (i.e., the feature extraction unit 510, the object detection unit 520, the key point detection unit 530 and the key point updating unit 1310) may execute the corresponding operations by using the pre-generated neural network (for example the second neural network). Therefore, each step shown in FIG. 15 (i.e., the feature extracting step S710, the object detecting step S720, the key point detecting step S730, step S1510 and step S1520) may also execute the corresponding operations by using the pre-generated neural network.

As described above, the present disclosure makes the key point detecting operation be integrated into the process of the object detecting operation so as to be implemented together by extracting from the image at one time features which can be used in the object detecting operation and the key point detecting operation and by using the pre-obtained key point sets. Therefore, according to the present disclosure, the time spent in the key point detecting operation (that is, the speed of key point detection) is independent of the number of objects in the image to be detected. Thus, according to the present disclosure, the whole detection speed can be ensured not to be influenced by the number of objects in the image to be detected while the objects and key points thereof are detected, so as to better meet the requirements of timeliness and practicability of the detection by the actual computer vision task.

(Application)

Figure 17:
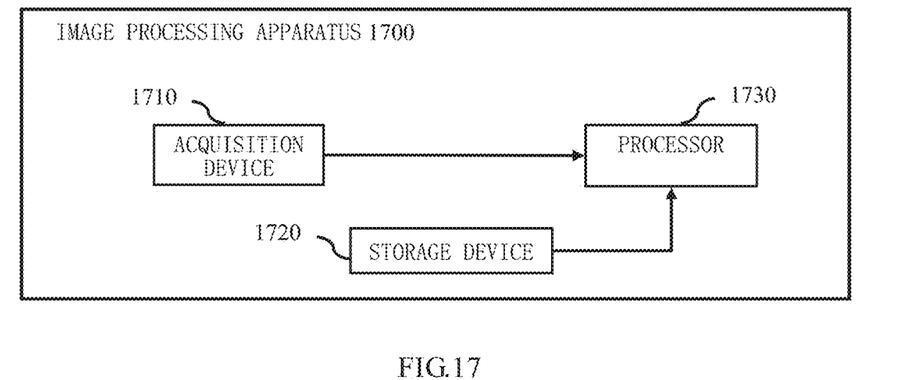
FIG. 17 shows an arrangement of an exemplary image processing apparatus according to the present disclosure.

In addition, as described above, the present disclosure can be implemented by a monitoring device (for example, a network camera). Therefore, as one application, by taking a case where the present disclosure is implemented by the network camera as an example, FIG. 17 shows an arrangement of an exemplary image processing apparatus 1700 according to the present disclosure. As shown in FIG. 17, the image processing apparatus 1700 includes at least an acquisition device 1710, a storage device 1720 and a processor 1730. Obviously, the image processing apparatus 1700 may also include an input device, an output device and so on which are not shown.

As shown in FIG. 17, firstly, the acquisition device 1710 (for example, the optical system of the network camera) captures the image/video of the place of interest (for example, the monitoring site) and transmits the captured image/video to the processor 1730. The above monitoring site may be for example places where motion detection and classification, abnormal/dangerous behavior detection, etc. are required to be performed.

The storage device 1720 stores instructions, wherein the stored instructions are at least instructions corresponding to the detection method described in FIGS. 7 to 12B and FIGS. 15 to 16.

The processor 1730 executes the stored instructions based on the captured image/video, such that at least the detection method described in FIGS. 7 to 12B and FIGS. 15 to 16 can be implemented, so as to detect the objects and key points thereof in the captured image/video.

In addition, in a case where the storage device 1720 also stores the subsequent image processing instructions, for example it is judged whether there are abnormal/dangerous behavior in the monitoring site, the processor 1730 may also implement the corresponding operation by executing the corresponding subsequent image processing instructions based on the detected objects and key points thereof (especially, the human and key points thereof). In this case, for example, an external display apparatus (not shown) may be connected to the image processing apparatus 1700 via the network, so that the external display apparatus may output the subsequent image processing results (for example, the appearance of abnormal/dangerous behavior, etc.) to the user/monitoring personnel. Alternatively, the above subsequent image processing instructions may also be executed by an external processor (not shown). In this case, the above subsequent image processing instructions, for example, are stored in an external storage device (not shown), and the image processing apparatus 1700, the external storage device, the external processor and the external display apparatus may be connected via the network, for example. Thus, the external processor may execute the subsequent image processing instructions stored in the external storage device based on the objects and key points thereof detected by the image processing apparatus 1700, and the external display apparatus can output the subsequent image processing results to the user/monitoring personnel.

Figure 18:
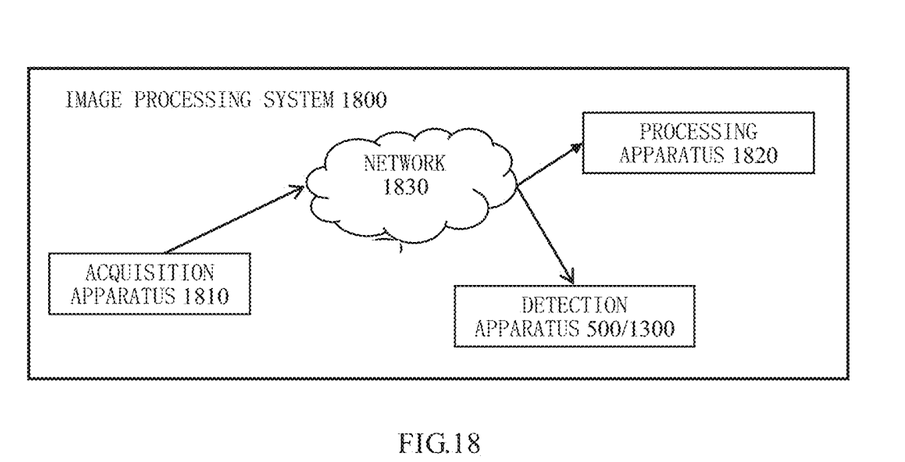
FIG. 18 shows an arrangement of an exemplary image processing system according to the present disclosure.

In addition, as described above, the present disclosure may also be implemented by a computer (for example, a client server). Therefore, as one application, by taking a case where the present disclosure is implemented by the client server as an example, FIG. 18 shows an arrangement of an exemplary image processing system 1800 according to the present disclosure. As shown in FIG. 18, the image processing system 1800 includes an acquisition apparatus 1810 (for example, at least one network camera), a processing apparatus 1820 and the detection apparatus 500 as shown in FIG. 5 or the detection apparatus 1300 as shown in FIG. 13, wherein the acquisition apparatus 1810, the processing apparatus 1820 and the detection apparatus 500/1300 are connected with each other via the network 1830. Wherein, the processing apparatus 1820 and the image processing apparatus 500/1300 may be realized by the same client server, or may also be realized by different client servers respectively.

As shown in FIG. 18, firstly, the acquisition apparatus 1810 captures the image or video of the place of interest (for example, the monitoring site) and transmits the captured image/video to the detection apparatus 500/1300 via the network 1830. The above monitoring site for example may be places where the motion detection and classification, abnormal/dangerous behavior detection, etc. are required to be performed.

The detection apparatus 500 detects the objects and key points thereof from the captured image/video with reference to FIGS. 7 to 12B, or detection apparatus 1300 detects the objects and key points thereof from the captured image/video with reference to FIGS. 15 to 16.

The processing apparatus 1820 executes subsequent image processing operations based on the detected objects and key points thereof, for example it is judged whether there is abnormal/dangerous behavior in the monitoring site. For example, the detected human and key points thereof may be compared with a predefined abnormal/dangerous rule to judge whether there is abnormal/dangerous behavior. For example, it is assumed that the predefined abnormal/dangerous rule is "in a case where many people gather together, there is abnormal/dangerous behavior", the corresponding image processing results (for example, there is abnormal/dangerous behavior, etc.) can be output to the user/monitoring personnel by a display apparatus or an alarm apparatus connected via the network 1830, in a case where the detected region information of the human is relatively dense.

In addition, the present disclosure can also be applied into the people counting system to expand the functions of the people counting system. For example, the region of the head of the human in the input image/video can be obtained by the people counting; thereafter, for the each obtained head region of the human, the key points of the head of the human can be detected by using the key point detecting operation performed in the step S730 shown in FIG. 7 or by using the key point detecting and updating operations performed in step S730 and steps S1510 to S1520 shown in FIG. 15, so that the people counting information can be further analyzed, such as the gender distribution of people, the age distribution of people, etc.

All of the above units are exemplary and/or preferred modules for implementing the processing described in the present disclosure. These units may be hardware units (such as field programmable gate array (FPGA), digital signal processors, application specific integrated circuits, etc.) and/or software modules (such as computer readable programs). The units for implementing each step are not described in detail above. However, in a case where there is a step to execute a particular procedure, there may be the corresponding functional module or unit (implemented by hardware and/or software) for implementing the same procedure. The technical solutions constituted by all combinations of the described steps and the units corresponding to these steps are included in the disclosure contents of the present application, as long as the technical solutions constituted by them are complete and applicable.

The methods and apparatuses of the present disclosure may be implemented in a variety of manners. For example, the methods and apparatuses of the present disclosure may be implemented by software, hardware, firmware or any combination thereof. Unless otherwise specified, the above sequence of steps in the present method is intended only to be illustrative and the steps in the method of the present disclosure are not limited to the specific sequence described above. In addition, in some embodiments, the present disclosure may also be implemented as a program recorded in a recording medium including machine-readable instructions for implementing the methods according to the present disclosure. Therefore, the present disclosure also covers a recording medium for storing a program for implementing the methods according to the present disclosure.

Although some specific embodiments of the present disclosure have been demonstrated in detail with examples, it should be understood by a person skilled in the art that the above embodiments are only intended to be illustrative but not to limit the scope of the present disclosure. It should be understood by a person skilled in the art that the above embodiments can be modified without departing from the scope and spirit of the present disclosure. The scope of the present disclosure is defined by the attached claims.

What is claimed is:

1. A detection apparatus comprising:
one or more processors; and at least
one or more memories storing executable instructions which, when executed by the one or more processors, cause the detection apparatus to perform operations including:
extracting features from an image;
detecting an object in the image based on the extracted features; determining a pre-obtained anchor set corresponding to a category of an object based on the detected object;
detecting a key point of the detected object based on the extracted features and the pre-obtained anchor set, wherein the key point represents a specific position of the detected object, and
updating the pre-obtained anchor set by adding, to the pre-obtained anchor set, an anchor based on a specific shape of the detected object,
wherein the pre-obtained anchor set is a set of a plurality of shapes included in the detected object of a specific category, and the key point indicates a position of the specific shape included in the plurality of the shapes.

2. The detection apparatus according to claim 1, wherein in a case where the detected object is a human,
the pre-obtained anchor set is an anchor set corresponding to a human body and the detected key point represents a part of the human body.

3. The detection apparatus according to claim 1, wherein, the extracted features, the detected object and the detected key point are obtained by using a pre-generated first neural network.

4. The detection apparatus according to claim 1, wherein executing the executable instructions causes the information processing apparatus to perform further operations including:
selecting at least once on a part of key points among a plurality of detected key points of the object; and
updating the selected key point of the object.

5. The detection apparatus according to claim 4, wherein the selected key point is determined based on a predefined threshold and confidence information of the detected key points of the object.

6. The detection apparatus according to claim 1, wherein in a case that the category of the object is a human, the pre-obtained anchor set includes a set of a plurality of shapes of human body, and the key point indicates a position of a specific human shape.

7. A detection method comprising:
extracting features from an image;
detecting an object in the image based on the extracted features;
determining a pre-obtained anchor set corresponding to a category of an object based on the detected object;
detecting a key point of the detected object based on the extracted features and the pre-obtained anchor set; and
updating the pre-obtained anchor set by adding, to the pre-obtained anchor set, an anchor based on a specific shape of the detected object,
wherein the pre-obtained anchor set is a set of a plurality of shapes included in the detected object of a specific category, and the key point indicates a position of the specific shape included in the plurality of the shapes.

* * * * *